United States Patent [19]

Frye et al.

[11] Patent Number: 5,076,871
[45] Date of Patent: Dec. 31, 1991

[54] METHOD OF FORMING COMPOSITE PREPREG ARTICLES UTILIZING HEAT-SHRINKABLE BRAIDED SLEEVES

[75] Inventors: Bradley A. Frye; Marcia R. Riley, both of Auburn, Wash.

[73] Assignee: The Boeing Company, Seattle, Wash.

[21] Appl. No.: 463,435

[22] Filed: Jan. 11, 1990

[51] Int. Cl.$^5$ .............................................. B32B 31/00
[52] U.S. Cl. ........................................ 156/86; 156/84;
156/155; 156/161; 156/165; 156/184; 156/189; 156/191
[58] Field of Search ................ 156/155, 161, 165, 184, 156/189, 190, 191, 192, 195, 84, 86, 144, 149

[56] References Cited

U.S. PATENT DOCUMENTS

| | | | |
|---|---|---|---|
| 2,652,093 | 9/1953 | Burton | 154/8 |
| 2,772,696 | 12/1956 | Schneider et al. | 156/190 X |
| 3,429,522 | 2/1969 | Cunningham et al. | 156/155 X |
| 3,669,157 | 6/1972 | Woodall, Jr. et al. | 139/387 |
| 3,773,593 | 11/1973 | Casadevall et al. | 156/191 X |
| 3,936,336 | 2/1976 | Phillips | 156/86 |
| 4,204,897 | 5/1980 | Bartell et al. | 156/155 |
| 4,216,047 | 8/1980 | Hilliard et al. | 156/289 X |
| 4,271,329 | 6/1981 | Perelmuter | 174/84 |
| 4,532,169 | 7/1985 | Carley | 156/161 X |
| 4,741,087 | 5/1988 | Plummer, Jr. | 29/446 |
| 4,777,859 | 10/1988 | Plummer, Jr. | 87/7 |

FOREIGN PATENT DOCUMENTS

49-34910 2/1977 Japan .
49-34911 5/1977 Japan .

*Primary Examiner*—David A. Simmons
*Assistant Examiner*—Sells J.
*Attorney, Agent, or Firm*—Christensen, O'Connor, Johnson & Kindness

[57] ABSTRACT

A method of forming composite prepreg articles. Prepreg plies (12) are laid up over a breakable mandrel (10), the mandrel having a configuration substantially matching the desired configuration of the composite prepreg article and being pre-coated to prevent the prepreg from sticking to it. A release film (14) is applied over the prepreg. A heat-shrinkable braided sleeve (16) is placed over the prepreg and release film and secured to the mandrel, thereby creating an assembly (28). The prepreg is first compacted by encapsulating the assembly and applying a vacuum, and is then substantially cured by exposing the assembly to heat. After curing, the braided sleeve and release film are removed. The cured prepreg, which serves as the desired composite prepreg article, is separated from the mandrel by breaking the mandrel.

40 Claims, 7 Drawing Sheets

METHOD OF FORMING COMPOSITE PREPREG ARTICLES UTILIZING HEAT-SHRINKABLE BRAIDED SLEEVES

TECHNICAL FIELD

This invention relates to methods of forming composite articles and, more specifically, to a method of forming composite prepreg articles particularly useful in the airline industry.

BACKGROUND OF THE INVENTION

The use of prepreg (i.e., fibrous material impregnated with uncured thermosettable resin) to form composite articles of manufacture is widespread. While prepreg is used in the airline industry to form various structural airplane parts, it also has significant application in the production of ductwork used on board an airplane.

The current manufacturing process for forming composite prepreg ducts of substantially circular cross section is to lay up plies of prepreg on a disposable plaster mandrel, the mandrel having been pre-coated with a parting substance to prevent the prepreg from sticking. A release film is then placed over the outermost ply of prepreg. Heat-shrinkable tape is then manually spirally wound over the release film, the tape having a certain amount of overlap when it is wound. Manual wrapping of the heat-shrinkable tape is an extremely labor-intensive process, and is thereby a significant manufacturing cost. The mandrel, laid up with prepreg and release film covered with heat-shrinkable tape, is then placed within an airtight bag to which a vacuum is applied, the vacuum serving to compact the prepreg plies.

The assembly of mandrel and radially outward-lying components is normally then placed in an oven and the application of heat causes the tape to shrink. Prior to introduction into the oven, a series of perforations are placed in the heat-shrinkable tape to allow excess resin to bleed through the tape during the heating process. The oven heat cures the resin and the simultaneous contraction of the tape consolidates the prepreg and eliminates or minimizes voids therebetween.

After the curing process is complete and adequate cooling has occurred, the contracted tape and release film are cut away and discarded. A hammer is applied to the outermost surface of the cured prepreg composite to break the internal disposable plaster mandrel, thereby leaving the desired end product, a composite prepreg duct. Because the cured prepreg composite may be slightly porous, a sealant is normally wiped or sprayed on the interior surface of the duct to provide an airtight seal between the interior and exterior of the duct.

When structural airplane parts (or ducts) of non-circular cross section are produced, the process is identical to that for producing ducts of circular cross section, except that heat-shrinkable tape may not be used. Instead, tape composed of an essentially non-shrinkable material (e.g., polyvinyl alcohol) is used to prevent the deformation and surface wrinkling of the part that would occur with heat-shrinkable tape.

As a result, there has been a long-felt need for a method of producing composite prepreg articles that does not possess the labor-intensive, tape-wrapping step of current manufacturing processes. The need is particularly strong in the airline industry, where extensive manufacturing costs associated with taping are incurred in the production of composite prepreg ducts and other structural parts. This invention is directed to satisfying this need.

SUMMARY OF THE INVENTION

In accordance with this invention, a method of forming composite prepreg articles is disclosed. The method includes applying at least one layer of a prepreg material over a breakable mandrel having a configuration substantially matching the desired configuration of the composite prepreg article. The prepreg material has a lengthwise dimension less than that of the mandrel, and the mandrel is pre-coated to prevent the prepreg material from sticking to it. At least one cylindrical braided sleeve is placed over the prepreg material and is secured to the mandrel, thereby creating an assembly. The prepreg material is first compacted and is then substantially cured by exposing the assembly to heat. The cured prepreg material, which serves as the desired composite prepreg article, is separated from the mandrel by breaking the mandrel. As will be appreciated, the method of the present invention, in each of its various embodiments, completely eliminates the tape-wrapping step of current manufacturing processes.

BRIEF DESCRIPTION OF THE DRAWINGS

The foregoing and other features and advantages of the present invention will become more readily appreciated as the same becomes better understood by reference to the following detailed description of the invention when taken in conjunction with the accompanying drawings, wherein.

DETAILED DESCRIPTION OF THE INVENTION

Figures 1, 2, 3:
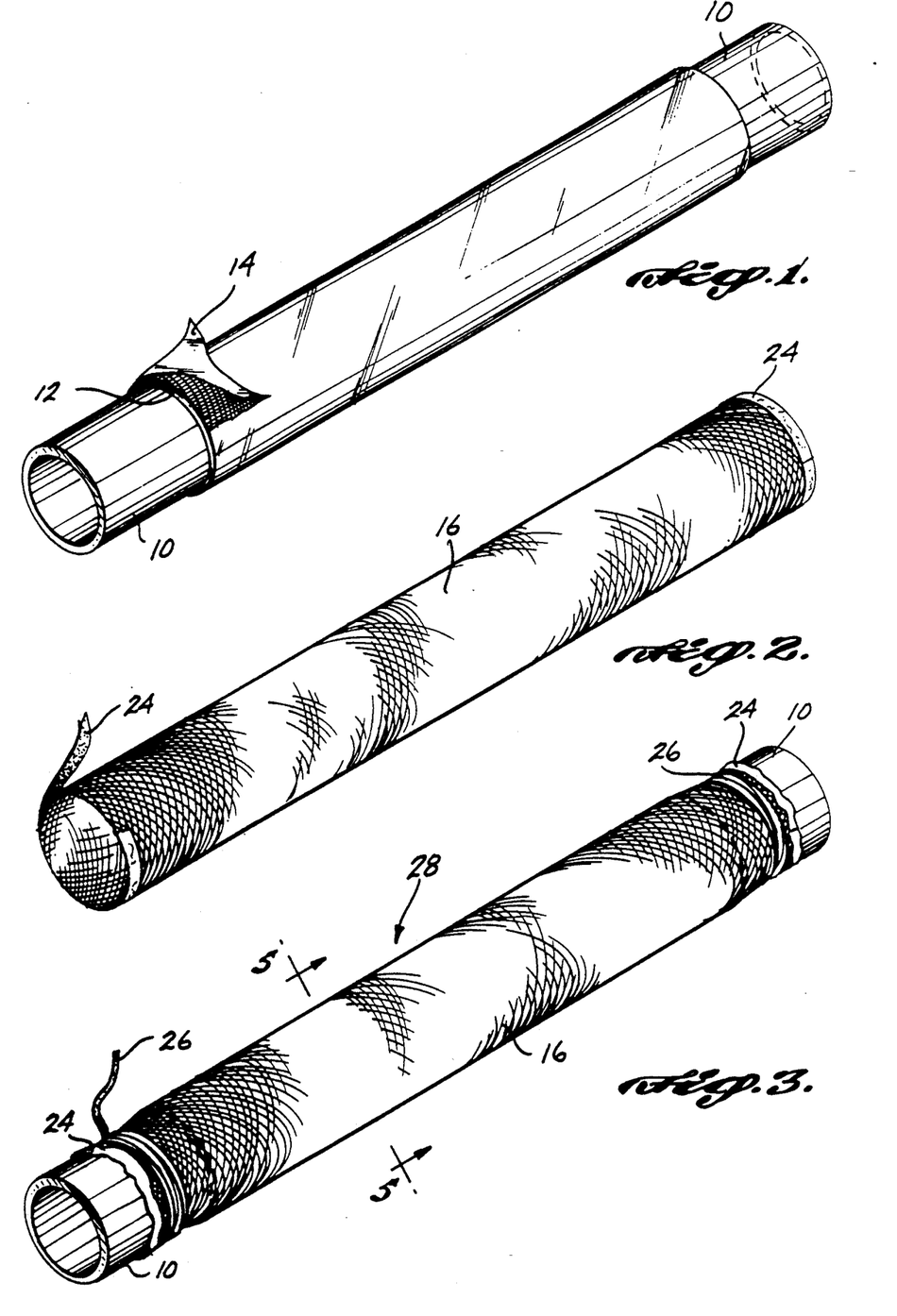
FIG. 1 is an isometric view illustrating a plurality of plies of prepreg material and a release film laid up over a mandrel in accordance with the method of the present invention, as utilized to form a cylindrical composite prepreg duct.
FIG. 2 is an isometric view illustrating a heat-shrinkable braided sleeve used in the method of the present invention.
FIG. 3 is an isometric view of the heat-shrinkable braided sleeve of FIG. 2 placed over the laid-up components of FIG. 1 and secured to the mandrel in accordance with the method of the present invention.
Figure 6:
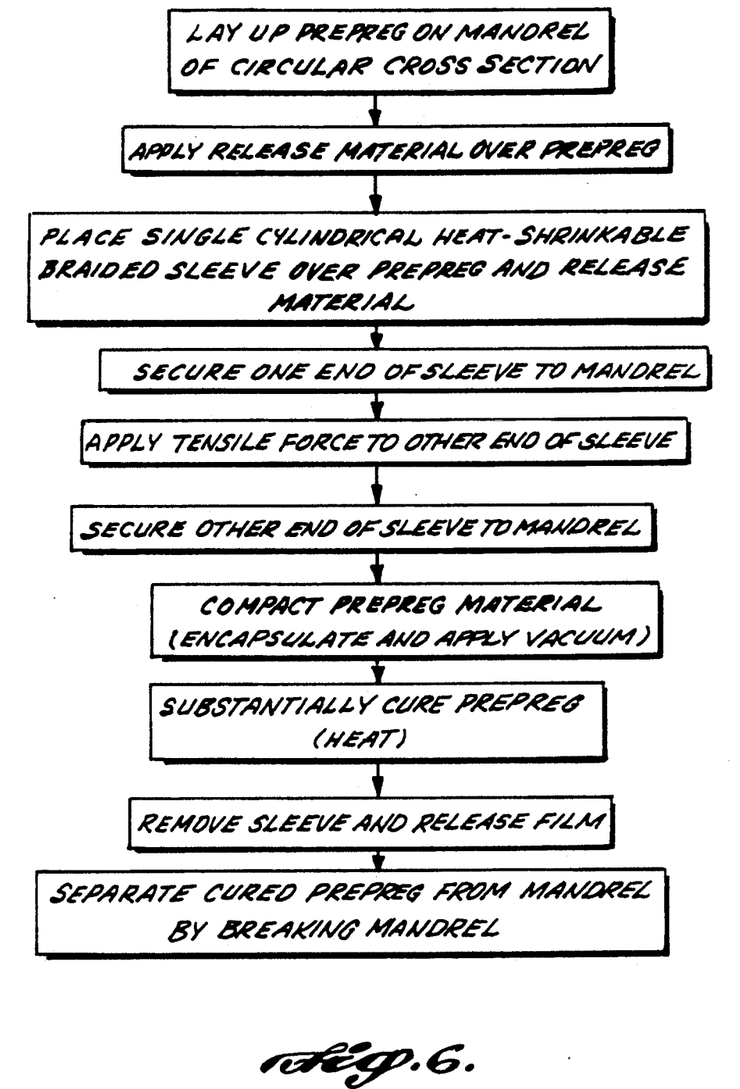
FIGS. 6 through 10 are flow diagrams illustrating various embodiments of the method of the present invention.

FIGS. 1, 2, and 3 illustrate a portion of the method of the present invention, when utilized to form a cylindrical composite prepreg duct. The full complement of steps in the method of the present invention are described in detail in the paragraphs that follow, and are illustrated as a flow diagram in FIG. 6.

A hollow cylindrical mandrel 10 is supported at each end at a lay-up work station (not shown). The mandrel has a thickness and is composed of a material that allows it to be relatively easily broken during the subsequent separation step described below. Preferably, the mandrel 10 is composed of plaster, which is calcium sulfate in either its anhydrite form (CaSO$_4$) or its hydrated form (CaSO$_4$.2(HOH)). The hydrated form is more commonly known as gypsum or plaster of Paris. The outer surface of the mandrel 10 is coated with a substance that prevents material from sticking to it. Preferably, the substance is a parting lacquer that is sprayed on and forms a moderately resilient, anti-stick layer over the plaster upon drying.

A series of layers of prepreg material 12 are successively laid up over the pre-coated mandrel 10. For purposes of illustration only, three prepreg plies 12A, 12B, and 12C are employed (see FIG. 5A). Each prepreg ply is a sheet of fibrous material impregnated with uncured thermosettable resin, the sheet having a length substantially corresponding to the desired length of the duct, but less than the length of the mandrel 10. The width of each sheet slightly exceeds the outer circumference of the mandrel 10, such that no gap or little overlap occurs as each sheet is laid up over the mandrel.

The fibrous material component of the prepreg sheets 12 is preferably aramid fiber or glass fiber. While ducts formed of glass fiber are advantageous at higher temperature applications, they tend to fracture upon the separation step described below. Furthermore, most onboard airplane ducts are not exposed to elevated temperatures. Accordingly, there has been a move to use aramid fiber in stead. Not only do ducts formed of aramid fiber resist fracture upon the separation step, but such ducts are stronger and approximately 30% lighter than composite prepreg ducts made from glass fiber. An aramid fiber found particularly effective in such applications is that produced and marketed under the trademark KEVLAR by E.I. du Pont de Nemours & Co. of Wilmington, Del. The uncured thermosettable resin component in the prepreg sheets 12, used to bind the fibrous material, is preferably polyester or epoxy resin. However, other uncured thermosettable resins may be employed.

A thin, pliable release film 14 is placed over the outermost layer of the prepreg material (ply 12A in FIG. 5A) in a manner similar to the laying up of the prepreg plies. The release film 14 is a sheet having a length substantially matching that of the prepreg sheets, and having a width substantially matching the outer circumference of the outermost prepreg ply. As with the laying up of the prepreg plies described above, adherence to this width avoids a gap and minimizes the chances of an area of overlap being formed. Preferably, the release film 14 is composed of a fluorinated ethylene-propylene resin.

Figure 4:
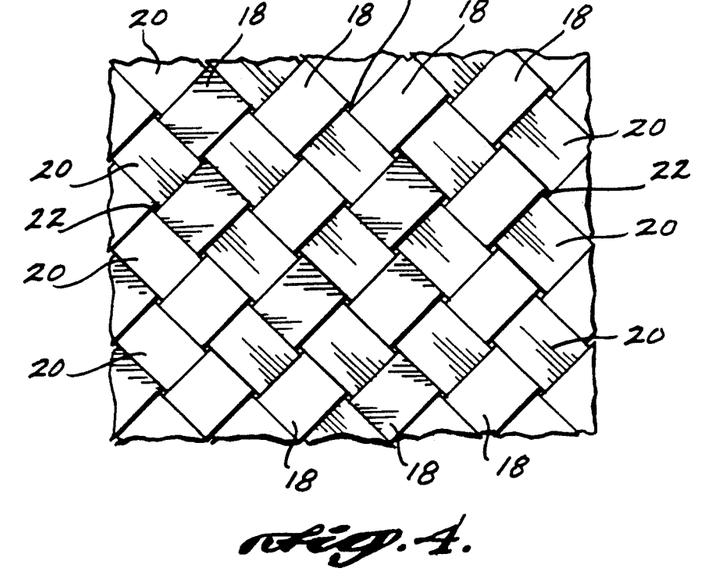
FIG. 4 is an enlarged detail view of the heat-shrinkable braided sleeve illustrated in FIG. 2, showing the size and orientation of the heat-shrinkable ribbons that make up the braided sleeve.

A cylindrical, heat-shrinkable braided sleeve 16 (shown in isolation in FIG. 2) is placed over the release film 14 and the prepreg plies 12 (refer to FIG. 3). The braided sleeve has a length sufficient to allow several inches of overlap on either end of the prepreg plies. Referring to FIG. 4, it is illustrated that the braided sleeve 16 is made up of a series of continuous heat-shrinkable ribbons 18 interwoven in braided fashion with a series of continuous heat-shrinkable ribbons 20 extending at approximately right angles to ribbons 18. Each ribbon 18 and 20 defines a helix oriented to provide an approximately 45° helix angle. While this orientation provides maximum uniform shrinkage in the axial and longitudinal directions, it is a matter of design choice and may be altered. The illustrated interwoven configuration results in small openings 22 existing between adjacent ribbons, the openings allowing excess resin to bleed outwardly through them during the resin curing step described below. As a result, the labor intensive, and somewhat dangerous, perforation step described in the Background of the Invention section above may be completely eliminated.

In a production setting, the braided sleeve 16 is cut to the desired length from a supply roll (not shown) of heat-shrinkable braided sleeve material formed in a cylindrical shape, but flattened to create a supply roll. A heat-shrinkable braided sleeve material, available in supply roll form, that has proven most efficacious in such applications is sold by Fiber Innovations, Inc. of Norwood, Mass. under Style No. FII-155 (2½ inch diameter sleeves) and Style No. FII-156 (3 inch diameter sleeves). After the braided sleeve 16 has been cut to the desired length from the supply roll, a strip of tape 24 is placed at each end of the braided sleeve to prevent fraying and unravelling of the ribbons making up the braided sleeve. The tape 24 also provides shape and rigidity to the ends of the braided sleeve 16, which facilitates placement of the braided sleeve over the release film 14 and the prepreg plies 12. It is preferable that the material of composition for the heat-shrinkable braided sleeve 16 also be slightly elastomeric to allow the sleeve to be slightly expanded from its natural state to ease placing it over the release film 14 and the prepreg plies 12.

After placement over the release film 14 and prepreg plies 12, one end of the heat-shrinkable braided sleeve 16 is secured to the mandrel 10 at a position adjacent one end of the prepreg plies (refer to FIG. 3). While the braided sleeve 16 may be secured by a myriad of approaches, it is preferable that multiple windings with a strip of tape 26 be employed. The free end of the heat-shrinkable braided sleeve 16 is pulled in a direction away from the end just secured, thereby reducing the cross-sectional dimension of the braided sleeve, which pulls the sleeve into snug contact with the release film 14. The free end of the braided sleeve 16, while still under a tensile force due to being pulled, is then secured to the mandrel 10 at a position adjacent the end of the prepreg plies 12. Once the heat-shrinkable braided sleeve 16 has been placed and secured, the result is the assembly 28 illustrated in FIG. 3.

The prepreg plies 12 are then compacted, preferably by encapsulating the assembly 28 within an airtight bag and applying a vacuum. However, other conventional methods of compaction may also be employed.

The assembly 28 is then exposed to heat to cure the uncured thermosettable resin in the prepreg material. The heat for curing may be supplied by placing the assembly 28 in an oven. While the operating oven temperature will vary with the fibrous material and resin chosen, it will be approximately 250° F. for aramid fiber and low-temperature glass fiber ducts, and approximately 350° F. for high-temperature glass fiber ducts. Most polyester and epoxy resins used in such applications can be substantially cured within one hour after reaching the curing temperature. However, because the mandrel 10 may contain a significant amount of water which must be driven off before the curing temperature is reached, the total residence time in the oven may be several hours.

Figure 5A:
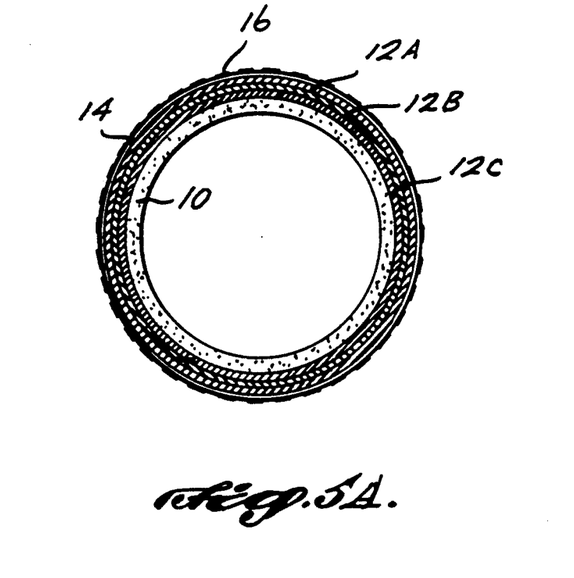
FIG. 5A is a cross-sectional end view taken along section 5—5 of FIG. 3 prior to curing the prepreg material.
Figure 5B:
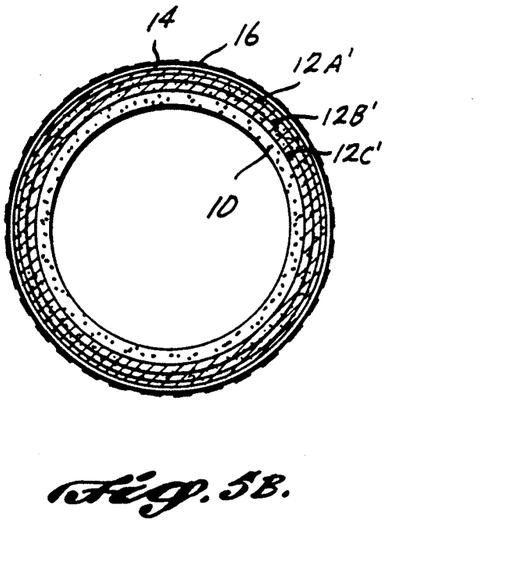
FIG. 5B is a cross-sectional end view taken along section 5—5 of FIG. 3 after curing the prepreg material.

The heating step causes the resin component to flow throughout the fibrous material of the uncured prepreg plies 12A, 12B, and 12C shown in FIG. 5A and ultimately thermoset to form the tightly-bonded cured plies 12A', 12B', and 12C' shown in FIG. 5B. The tight bonding is also partially due to the consolidation of the prepreg plies incident to the simultaneous contraction of the heat-shrinkable braided sleeve 16. It is these cured plies 12A', 12B', and 12C' that make up the composite prepreg duct that is the ultimate end product of the method of the present invention.

After the curing process is complete and the assembly 28 has been allowed to cool, the contracted heat-shrinkable braided sleeve 16 and release film 14 are removed. The tape 26 is first removed from each end of the braided sleeve and then the sleeve and release film are manually cut from one end to the other with a hand-held seam ripper. While traditional cutting implements (e.g., carpet knife) may be employed to remove the braided sleeve 16 and release film 14, they are not preferable because of the increased likelihood of puncturing the cured plies. The heat-shrinkable braided sleeve 16 and the release film 14 may be bonded together by excess resin that has bled outwardly from the prepreg plies 12 during the curing process. If so, they may be removed as a single unit.

The tightly-bonded cured plies 12A', 12B', and 12C' are then separated from the mandrel 10 by breaking the mandrel. This is accomplished by hammering the outside surface of the cured plies with force sufficient to cause the mandrel to break at the inside surface of the plies, but insufficient to cause fracturing or other structural damage to the plies. The hammering force may be supplied by a hand-held rubber mallet, or may be supplied by an automatically powered (e.g., pneumatic or electric) hammering tool. Once the mandrel 10 has been so separated, the cured plies serve as the duct sought to be produced. Usually, the duct is sealed, as described in the Background of the Invention section above, and trimmed to remove slight irregularities prior to use.

Figure 7:
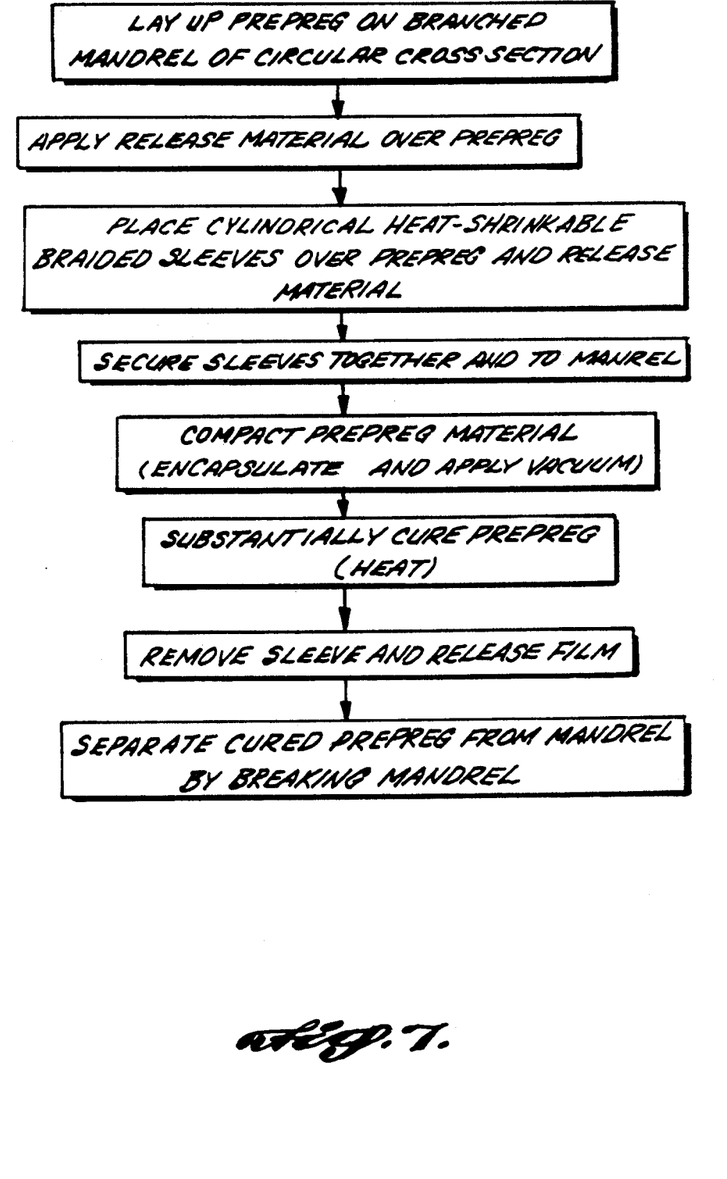

While the formation of a linear, uniformly cylindrical duct has been illustrated for the sake of simplicity and clarification, the method of the present invention may also be employed to produce ductwork that is not linear. For example, if a T-shaped or Y-shaped piece of ductwork is to be formed, three braided sleeves of appropriate dimension are employed. In order to cover the areas at the junction of such branched parts, the braided sleeves are cut on one end and overlapped to ensure that no area of release film and underlying prepreg material is uncovered. Because the cut and overlapped end of each sleeve nearest the junction cannot be secured to the branched mandrel, a hand-held heat gun may be used to heat and thereby bind them together. This allows the opposite end of each sleeve to be pulled and secured to the branched mandrel in the manner described above. The method of the present invention, when utilized to produce branched cylindrical articles, is illustrated as a flow diagram in FIG. 7.

Figure 8:
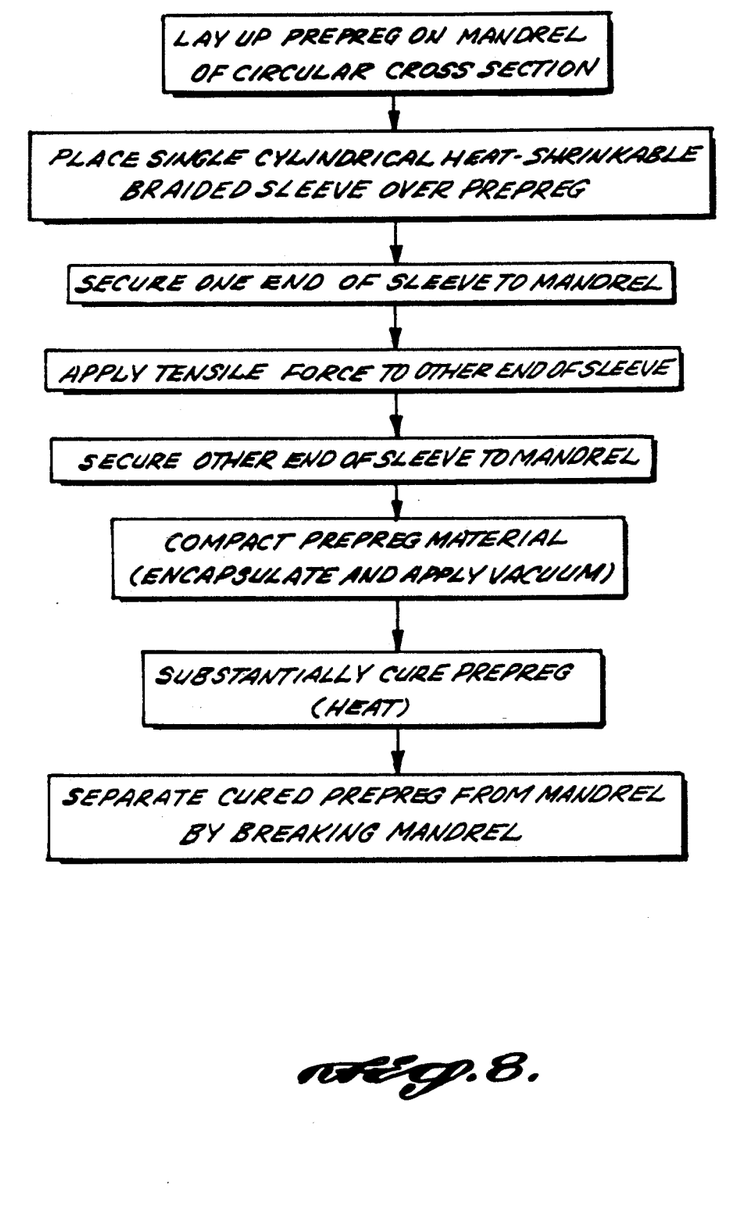
Figure 9:
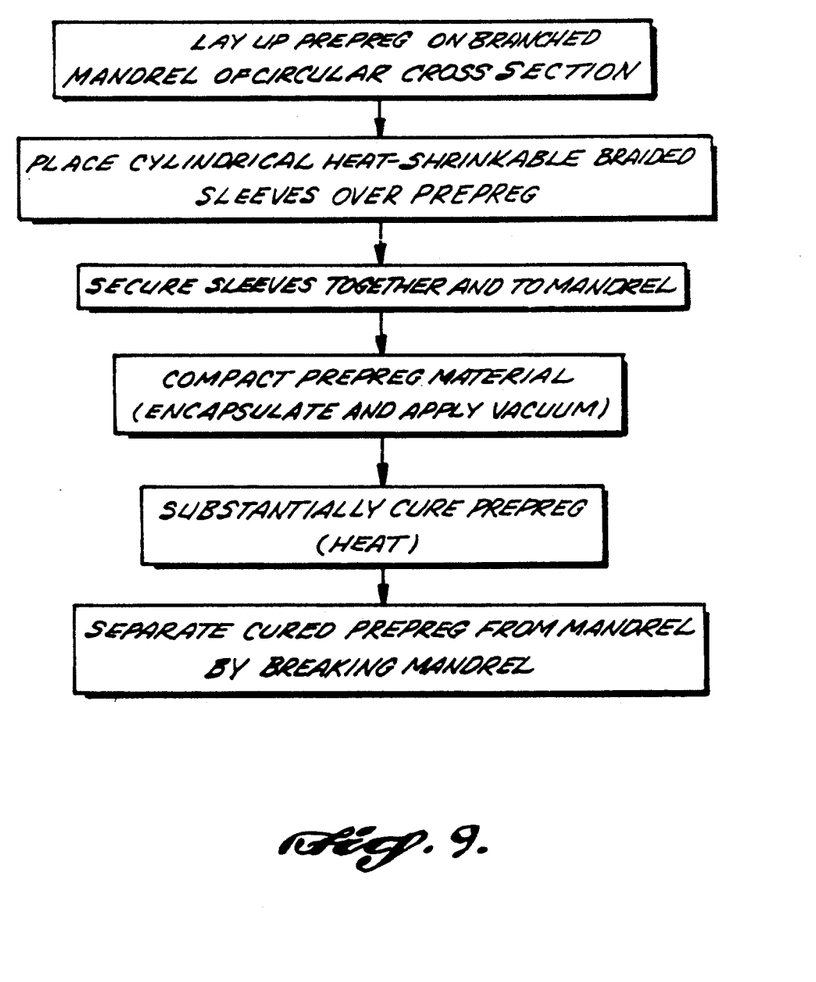

In accordance with an alternative embodiment of the method of the present invention, no release material is applied over the outermost layer of the prepreg material, and the heat-shrinkable braided sleeve is not removed after the curing process. Given the absence of a release material, the heat-shrinkable braided sleeve tightly adheres to the outermost layer of prepreg material during the curing process. Because of the level of binding between the two, the ends of the braided sleeve not covering prepreg material may be removed, while that portion covering the prepreg material stays firmly in place. The mandrel may then be separated from the cured prepreg material by hammering the outside surface of the heat-shrinkable braided sleeve. Such hammering must be sufficient to break the mandrel without damaging the braided sleeve or the underlying cured prepreg material. Because the braided sleeve does not subsequently unravel from the cured prepreg material, as occurs with heat-shrinkable tape, an airtight seal is maintained between the interior and the exterior of the cured prepreg material. As a result, the sealing process fully described in the Background of the Invention section above may be completely eliminated. This alternative embodiment, where the heat-shrinkable braided sleeve is not removed, is applicable to the production of linear cylindrical parts (see FIG. 8) and branched cylindrical parts (see FIG. 9).

Figure 10:
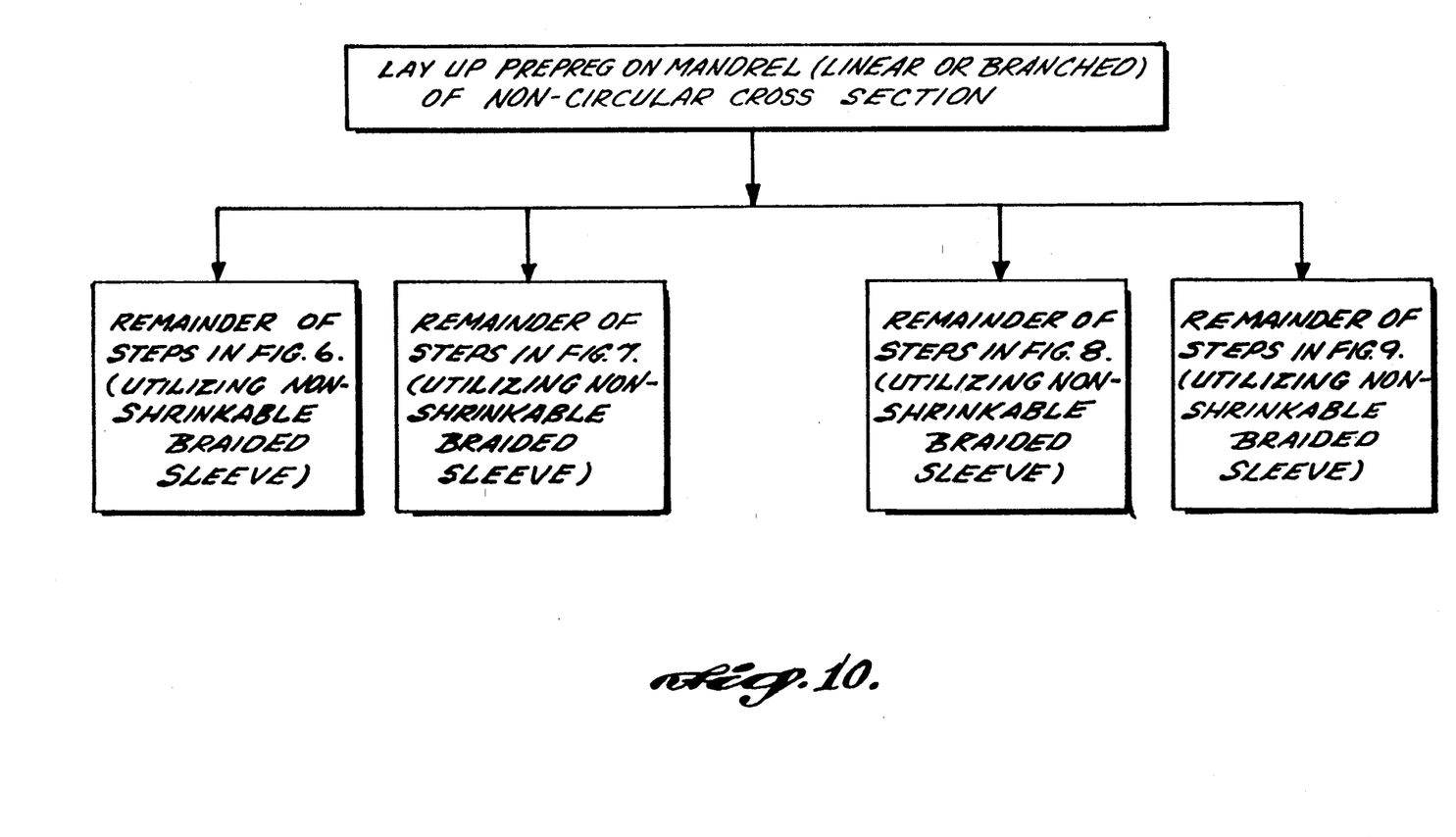

In accordance with yet another alternative embodiment of the method of the present invention, the cylindrical braided sleeve may be used in the formation of composite prepreg articles of non-circular cross section, as illustrated in flow diagram form in FIG. 10. Linear or branched articles may be produced, with or without removal of the braided sleeve. As long as the non-circular cross section of the desired composite prepreg article is square or slightly rectangular, a braided sleeve having a slightly elastomeric nature allows the article to be formed in a manner identical to that described in detail above. However, since deformation and wrinkling can occur to articles of this shape due to contraction of the braided sleeve, the braided sleeve for these applications must be composed of a substantially non-shrinkable material. Preferably, the non-shrinkable (and slightly elastomeric) braided sleeve is composed of polyvinyl alcohol.

While several embodiments of the present invention have been illustrated and described, it should be understood that variations could be made therein without departing from the spirit and scope of the invention. Accordingly, it is to be understood that the invention is not to be limited to the specific embodiments illustrated and described. Rather, the true scope and spirit of the invention is to be determined by reference to the following claims.

The embodiments of the invention in which an exclusive property or privilege is claimed are defined as follows:

1. A method of forming composite prepreg articles, the method comprising:
   (a) applying at least one layer of a prepreg material over a breakable mandrel having a configuration substantially matching the desired configuration of the composite prepreg article, said prepreg material having a lengthwise dimension less than that of said mandrel, said breakable mandrel being precoated to prevent said prepreg material from sticking to it;
   (b) placing at least one pre-formed cylindrical braided sleeve formed of a heat-shrinkable material over said prepreg material;
   (c) securing said at least one pre-formed cylindrical braided sleeve to said mandrel to create an assembly by:
      (i) securing a first end of said heat-shrinkable braided sleeve to said mandrel at a position adjacent a first end of said prepreg material,
      (ii) applying a tensile force to a second end of said heat-shrinkable braided sleeve to reduce the cross-sectional dimension of said sleeve, and
      (iii) securing the second end of said heat-shrinkable braided sleeve to said mandrel at a position adjacent a second end of said prepreg material while said sleeve is under said tensile force;
(d) compacting said prepreg material;
(e) substantially curing said prepreg material by exposing said assembly to heat; and
(f) separating said cured prepreg material from said mandrel by breaking said mandrel.

2. The method of claim 1, wherein:
said breakable mandrel is of linear configuration and has a substantially circular cross section.

3. The method of claim 2, wherein said breakable mandrel is composed of plaster.

4. The method of claim 2, wherein said breakable mandrel is configured to produce a composite prepreg duct.

5. The method of claim 2, wherein said breakable mandrel is pre-coated with a parting lacquer.

6. The method of claim 2, wherein said prepreg material is compacted by encapsulation and the application of a vacuum.

7. The method of claim 2, wherein said heat-shrinkable braided sleeve is slightly elastomeric to allow said sleeve to be slightly expanded from its natural state to ease placing it over said prepreg material.

8. The method of claim 2, further comprising:
after applying said prepreg material, applying a release material over the outermost layer of said prepreg material, said heat-shrinkable braided sleeve being placed over said release material and said prepreg material; and
after substantially curing said prepreg material, removing said heat-shrinkable braided sleeve and said release material.

9. The method of claim 8, wherein said breakable mandrel is composed of plaster.

10. The method of claim 8, wherein said breakable mandrel is configured to produce a composite prepreg duct.

11. The method of claim 8, wherein said breakable mandrel is pre-coated with a parting lacquer.

12. The method of claim 8, wherein said prepreg material is compacted by encapsulation and the application of a vacuum.

13. The method of claim 8, wherein said release material is composed of fluorinated ethylene-propylene resin.

14. The method of claim 8, wherein said heat-shrinkable braided sleeve is slightly elastomeric to allow said sleeve to be slightly expanded from its natural state to ease placing it over said release material and said prepreg material.

15. The method of claim 1, wherein:
said breakable mandrel is of branched configuration and has a substantially circular cross section;
said at least one cylindrical braided sleeve is a plurality of heat-shrinkable braided sleeves; and
said plurality of heat-shrinkable braided sleeves are secured to said mandrel at one end and to one or more other sleeves at the other end.

16. The method of claim 15, wherein said breakable mandrel is composed of plaster.

17. The method of claim 15, wherein said breakable mandrel is configured to produce a composite prepreg duct.

18. The method of claim 15, wherein said breakable mandrel is precoated with a parting lacquer.

19. The method of claim 15, wherein said prepreg material is compacted by encapsulation and the application of a vacuum.

20. The method of claim 15, wherein said heat-shrinkable braided sleeves are slightly elastomeric to allow said sleeves to be slightly expanded from their natural state to ease placing them over said prepreg material.

21. The method of claim 15, further comprising:
after applying said prepreg material, applying a release material over the outermost layer of said prepreg material, said heat-shrinkable braided sleeves being placed over said release material and said prepreg material; and
after substantially curing said prepreg material, removing said heat-shrinkable braided sleeves and said release material.

22. The method of claim 21, wherein said breakable mandrel is composed of plaster.

23. The method of claim 21, wherein said breakable mandrel is configured to produce a composite prepreg duct.

24. The method of claim 21, wherein said breakable mandrel is precoated with a parting lacquer.

25. The method of claim 21, wherein said prepreg material is compacted by encapsulation and the application of a vacuum.

26. The method of claim 21, wherein said release material is composed of fluorinated ethylene-propylene resin.

27. The method of claim 21, wherein said heat-shrinkable braided sleeves are slightly elastomeric to allow said sleeves to be slightly expanded from their natural state to ease placing them over said release material and said prepreg material.

28. The method of claim 1, wherein:
said breakable mandrel is of linear configuration and has a non-circular cross section;
said at least one cylindrical braided sleeve is a single substantially non-shrinkable braided sleeve; and
said securing step comprises:
(i) securing a first end of said substantially non-shrinkable braided sleeve to said mandrel at a position adjacent a first end of said prepreg material,
(ii) applying a tensile force to a second end of said substantially non-shrinkable braided sleeve to reduce the cross-sectional dimension of said sleeve, and
(iii) securing the second end of said substantially non-shrinkable braided sleeve to said mandrel at a position adjacent a second end of said prepreg material while said sleeve is under said tensile force.

29. The method of claim 28, wherein said substantially non-shrinkable braided sleeve is slightly elastomeric to allow said sleeve to be slightly expanded from its natural state to ease placing it over said prepreg material.

30. The method of claim 28, further comprising:
after applying said prepreg material, applying a release material over the outermost layer of said prepreg material, said substantially non-shrinkable braided sleeve being placed over said release material and said prepreg material; and
after substantially curing said prepreg material, removing said substantially non-shrinkable braided sleeve and said release material.

31. The method of claim 30, wherein said substantially non-shrinkable braided sleeve is slightly elastomeric to allow said sleeve to be slightly expanded from its natural state to ease placing it over said release material and said prepreg material.

32. The method of claim 28, wherein said substantially non-shrinkable braided sleeve is composed of polyvinyl alcohol.

33. The method of claim 1, wherein:
said breakable mandrel is of branched configuration and has a non-circular cross section;
said at least one cylindrical braided sleeve is a plurality of substantially non-shrinkable braided sleeves; and
said plurality of substantially non-shrinkable braided sleeves are secured to said mandrel at one end and to one or more other sleeves at the other end.

34. The method of claim 33, wherein said substantially non-shrinkable braided sleeves are slightly elastomeric to allow said sleeves to be slightly expanded from their natural state to ease placing them over said prepreg material.

35. The method of claim 33, further comprising:
after applying said prepreg material, applying a release material over the outermost layer of said prepreg material, said substantially non-shrinkable braided sleeves being placed over said release material and said prepreg material; and
after substantially curing said prepreg material, removing said substantially non-shrinkable braided sleeves and said release material.

36. The method of claim 35, wherein said substantially non-shrinkable braided sleeves are slightly elastomeric to allow said sleeves to be slightly expanded from their natural state to ease placing them over said release material and said prepreg material.

37. The method of claim 33, wherein said substantially non-shrinkable braided sleeve is composed of polyvinyl alcohol.

38. The method of claim 1, wherein said prepreg material comprises a fibrous material impregnated with uncured thermosettable resin.

39. The method of claim 38, wherein said fibrous material is selected from the group consisting of aramid fiber and glass fiber.

40. The method of claim 38, wherein said uncured thermosettable resin is selected from the group consisting of polyester resin and epoxy resin.

* * * * *